Patented May 2, 1939

2,156,942

UNITED STATES PATENT OFFICE 2,156,942

EXPLOSIVE

George B. Hatch, Pittsburgh, Pa., assignor to Western Cartridge Company, East Alton, Ill., a corporation of Delaware No Drawing. Application March 4, 1937,
Serial No. 128,984

12 Claims. (Cl. 52—2)

This invention relates generally to ammunition and particularly to priming compositions for use in ammunition.

In priming compositions such as are usually employed in small arms ammunition, it has been common practice in the past to employ a small proportion of ground glass which acts in the capacity of sensitizing the explosive composition and operates in response to a blow struck upon the primer to assist in the ignition of the priming composition. Heretofore the ground glass employed in priming compositions has been selected primarily with reference to its abrasive characteristics and no particular attention has been paid to the chemical composition of the glass employed since it has been generally recognized that the glass component of the priming composition does not enter into the explosive reaction except by mechanical sensitization.

It has heretofore been usual to employ the ordinary soda-lime glass of any common or available composition. Glasses of this character are subject to so-called weathering in consequence of which upon exposure to humid atmosphere a small percentage of the compounds entering into the glass have a tendency to dissolve. This is particularly true of the alkali content and it is a familiar fact that ordinary glass is dissolved upon prolonged exposure to water to the extent of a fraction of one percent. This tendency to dissolve and to liberate alkali is considerably enhanced when the available surface is enlarged as is the case when the glass is divided into fine particles. While the solubility of any given glass depends to a large extent upon the composition of the batch from which it is made and variations in the proportions of ingredients alter the solubility of the resultant glass, glasses of the soda-lime type generally contain in excess of .1% soluble alkali.

There have heretofore been produced various varieties of glass which are denominated in the art as insoluble glasses. Among these may be mentioned borosilicate glasses, lead glasses and various barium containing glasses. These glasses have an extremely low order of solubility and may be regarded as substantially insoluble.

Samples of different types of glasses have been examined to determine the alkalinity developed on extended treatment with hot water. In order to make this determination, samples of various glasses were ground to fineness such as to pass a 100 mesh screen and be retained on a 150 mesh screen. These samples were each treated with distilled water for a period of fifteen hours at a temperature of 74° C. After cooling and titrating the resultant solution with N/50 sulphuric acid, the alkalinity of the respective samples in terms of percentage of dissolved sodium hydroxide by weight of the glass was determined as follows:

|  | Per cent |
|---|---|
| Resistant borosilicate glass—less than | 0.0005 |
| Lead disilicate glass—less than | 0.0005 |
| Soda-lime glass, No. 1 | 0.31 |
| Soda-lime glass, No. 1, acid washed | 0.11 |
| Soda-lime glass, No. 2 | 0.14 |

While, as remarked above, it has heretofore been assumed that the ground glass ingredient of a priming composition was inert and that it was incapable of entering into the chemical reaction in a primer, it has also been observed that priming compositions containing ground glass have frequently not measured up to the optimum standards of stability particularly under adverse storage conditions.

The object of the present invention, generally stated, is to improve the stability of a priming composition containing ground glass.

A further object of the present invention is to provide a priming composition containing ground glass of a character such that it is incapable of exerting any deleterious action on other ingredients of the priming composition.

Other objects of the invention will become apparent to those skilled in the art when the following description is read.

In accordance with the present invention, generally stated, the ground glass employed in priming compositions is prepared from the so-called insoluble glasses. Any of the so-called insoluble glasses as, for example, the borosilicate glasses, the lead glasses and the various barium-containing glasses which are known to have a low order of solubility may be employed. Priming compositions for ammunition usually contain one or more chemically active ingredients of a character such that they are not entirely stable in the presence of alkali and consequently upon storage under humid conditions, the alkali from the ordinary types of glass may become dissolved and exert a deleterious action which tends to render the priming composition unstable or inactive. By utilizing the so-called insoluble glass as the ground glass ingredient of such priming composition, however, marked improvements in the stability of such priming composition is obtained.

As an illustrative embodiment of the present invention an insoluble glass of the borosilicate type, such as one known as Pyrex, and having the approximate composition:

|  | Percent |
|---|---|
| Silica | 80 |
| Boric acid | 12 |
| Sodium oxide | 4 |
| Iron and aluminum oxides | 2 |
| (Potassium and calcium oxides less than 0.5%) | | may be employed as the ground glass ingredient of a priming mixture. For example, a given priming composition including ground glass as an ingredient was prepared containing the borosilicate glass of the type just described, and an identical composition was prepared containing the ordinary soda-lime glass as the sensitizing ingredient. Shells were loaded with these priming compositions and stored under conditions of 90% relative humidity at 74° C., thereafter being tested at intervals for misfires with the following results:

| Days storage | Percent misfires | |
|---|---|---|
| | Soda-lime glass | Borosilicate |
| 4 | 30 | 0 |
| 5 | 100 | 0 |
| 6 | | 0 |
| 13 | | 10 |
| 21 | | 50 |

As further illustrating the discovery that the solubility of the glass employed in such priming compositions does exert an action upon priming compositions tending to render the same unstable or inactive, a similar test to that just described was run upon the same composition containing as the ground glass ingredient the same soda-lime glass which was employed above, but which before incorporation in the priming composition had been subjected to an acid-washing treatment. After storage under the conditions, stated above, the following results were obtained:

| Days storage | Percent misfires—acid-washed soda-lime glass |
|---|---|
| 4 | 25 |
| 5 | 50 |
| 6 | 90 |

In the priming composition which was the subject of the tests just described, the ground glass content amounted to 20%.

Similar results were obtained in another series of tests using the same priming composition. Shells charged with such a priming composition, some of which contained ground soda-lime glass as an ingredient, some of which contained lead disilicate glass and some of which contained borosilicate glass produced the following results:

| Days storage | Percent misfires | | |
|---|---|---|---|
| | Soda-lime | Lead disilicate glass | Borosilicate |
| 9 | 70 | 0 | 0 |
| 20 | | 0 | 0 |
| 24 | | 5 | 0 |
| 31 | | 70 | 0 |
| 34 | | 90 | 30 |
| 44 | | | 70 |

The specific priming composition employed in each of the stability tests just given was constituted as follows:

Parts by weight
Lead azide_____ 19
Tetrazene_____ 7
Antimony sulfide_____ 7.5
Barium nitrate_____ 44.3
Ground glass_____ 20
Ester gum_____ 2.2

Another series of tests was run employing a priming composition as follows:

Lead azide_____ 19
Tetrazene_____ 7
Barium nitrate_____ 53
Antimony sulfide_____ 13.5
Glass_____ 5
Ester gum_____ 2.5

As in the previous case this composition was made up employing soda-lime glass in one batch, lead disilicate in another batch and borosilicate glass in a third batch. Upon being subjected to storage under the conditions described above, the following results were obtained:

| Days storage | Percent misfires | | |
|---|---|---|---|
| | Soda-lime | Lead disilicate glass | Borosilicate |
| 14 | 0 | 0 | 0 |
| 20 | 70 | 4 | |
| 27 | | 12 | 0 |
| 34 | | 24 | 4 |

A further series of tests was run upon lead styphnate priming compositions constituted as follows:

| | Specific | General |
|---|---|---|
| Lead styphnate | 40 | 35–50 |
| Tetrazene | 4 | 1–12 |
| Lead dinitrosoresorcinate | 6 | 3–15 |
| Barium nitrate | 29 | 20–40 |
| Glass | 20 | 10–30 |
| Gum arabic | 1 | 1–2 |

As well as upon a mercury fulminate composition constituted as follows:

| | Specific | General |
|---|---|---|
| Mercury fulminate | 40 | 35–45 |
| Lead dinitrosoresorcinate | 11 | 5–15 |
| Barium nitrate | 22 | 15–35 |
| Lead chromate | 11 | 5–15 |
| Glass | 15 | 15–25 |
| Gum arabic | 1 | 1–2 |

The lead styphnate priming composition and the mercury fulminate priming composition, just stated, were made up, employing in separate batches ordinary soda-lime glass and borosilicate glass. These were charged into shells and stored at 50° C. and at 90% relative humidity. Likewise the lead azide priming composition having a 20% ground glass content was subjected to the same storage tests. These shells were then tested for retention of sensitivity at various time intervals. The following tables show the percentages of malfunctions (misfires, hangfires, and partial ignition of the primer):

*Azide primer*

| Days stored | 24 | 31 | 46 | 53 |
|---|---|---|---|---|
| Borosilicate glass | 0 | 0 | 7 | 87 |
| Soda-lime glass | 0 | 1 | 45 | 100 |

*Styphnate primer*

| Days stored | 28 | 35 | 42 | 49 |
|---|---|---|---|---|
| Borosilicate glass | 10 | 7 | 16 | 37 |
| Soda-lime glass | 18 | 25 | 35 | 76 |

*Fulminate primer*

| Days stored | 17 | 24 | 35 |
| --- | --- | --- | --- |
| Borosilicate glass | 18 | 54 | 68 |
| Soda-lime glass | 37 | 88 | 92 |

From the data hereinbefore given it is apparent that, by the selection of glass to be used as the ground glass ingredient in priming compositions in accordance with the present invention so as to provide a glass of minimum soluble content of alkali and alkaline earth oxides, the stability of the priming composition may be improved. While in the foregoing description reference has been made and a specific example given of each of three types of primers: namely, lead azide, lead styphnate and mercury fulminate, it is not to be understood that the invention is limited to these particular types of primers, nor to the proportions of such priming compositions as hereinbefore stated. On the contrary whenever a priming composition contains one or more ingredients which have a tendency to become unstable or inactive upon exposure to alkali solutions, the present invention contemplates that a glass of insoluble type be employed. It is, therefore, to be distinctly understood that the invention is not limited to the specific embodiments which have been given for the purpose of illustration, but on the contrary the features of the present invention are applicable at large to priming compositions containing ingredients subject to deterioration in the presence of alkali. It is, therefore, to be understood that such modification and application of the present invention as does not depart from the spirit thereof is, although not specifically described herein, contemplated by and within the scope of the appended claims.

Having thus described the invention what is claimed is:

1. A primer comprising an active ingredient which is unstable in the presence of alkali and ground glass of substantially neutral reaction.

2. A primer comprising ground glass of substantially neutral reaction and explosive ingredients which are unstable in the presence of alkali.

3. A primer comprising an active ingredient which is unstable in the presence of alkali and ground glass having a water soluble alkali content of about 0.001% or less.

4. A primer comprising explosive ingredients of a type which are unstable in the presence of alkali, and ground glass having a water soluble alkali content below about 0.001%.

5. A primer comprising explosive ingredients of a type which are unstable in the presence of alkali and ground glass of substantially water insoluble type.

6. A primer comprising explosive ingredients of a type which are unstable in the presence of alkali, and a ground glass of the borosilicate type.

7. A primer comprising explosive ingredients of a type which are unstable in the presence of alkali, and ground glass of the lead silicate type.

8. A primer comprising explosive ingredients of a type which are unstable in the presence of alkali, and ground glass which has been acid washed to an extent sufficient to reduce the soluble alkali content thereof to not more than about 0.11%.

9. A primer comprising, an active ingredient which is unstable in the presence of alkali, and ground glass of substantially water insoluble type.

10. A primer comprising, an active ingredient which is unstable in the presence of alkali, and a ground glass of the borosilicate type.

11. A priming mixture comprising, an explosive ingredient, an oxidizing agent, a fuel, one or more of said ingredients being unstable in the presence of alkali, and ground glass of substantially water insoluble type.

12. A priming mixture comprising, an explosive ingredient, an oxidizing agent, a fuel, one or more of said ingredients being unstable in the presence of alkali, and ground resistant borosilicate glass.

GEORGE B. HATCH.